Sept. 27, 1949.　　　　K. P. BILLNER　　　　2,483,175
METHOD OF MOLDING PRESTRESSED STRUCTURES
Filed Oct. 10, 1947　　　　　　　　　　　　4 Sheets-Sheet 1
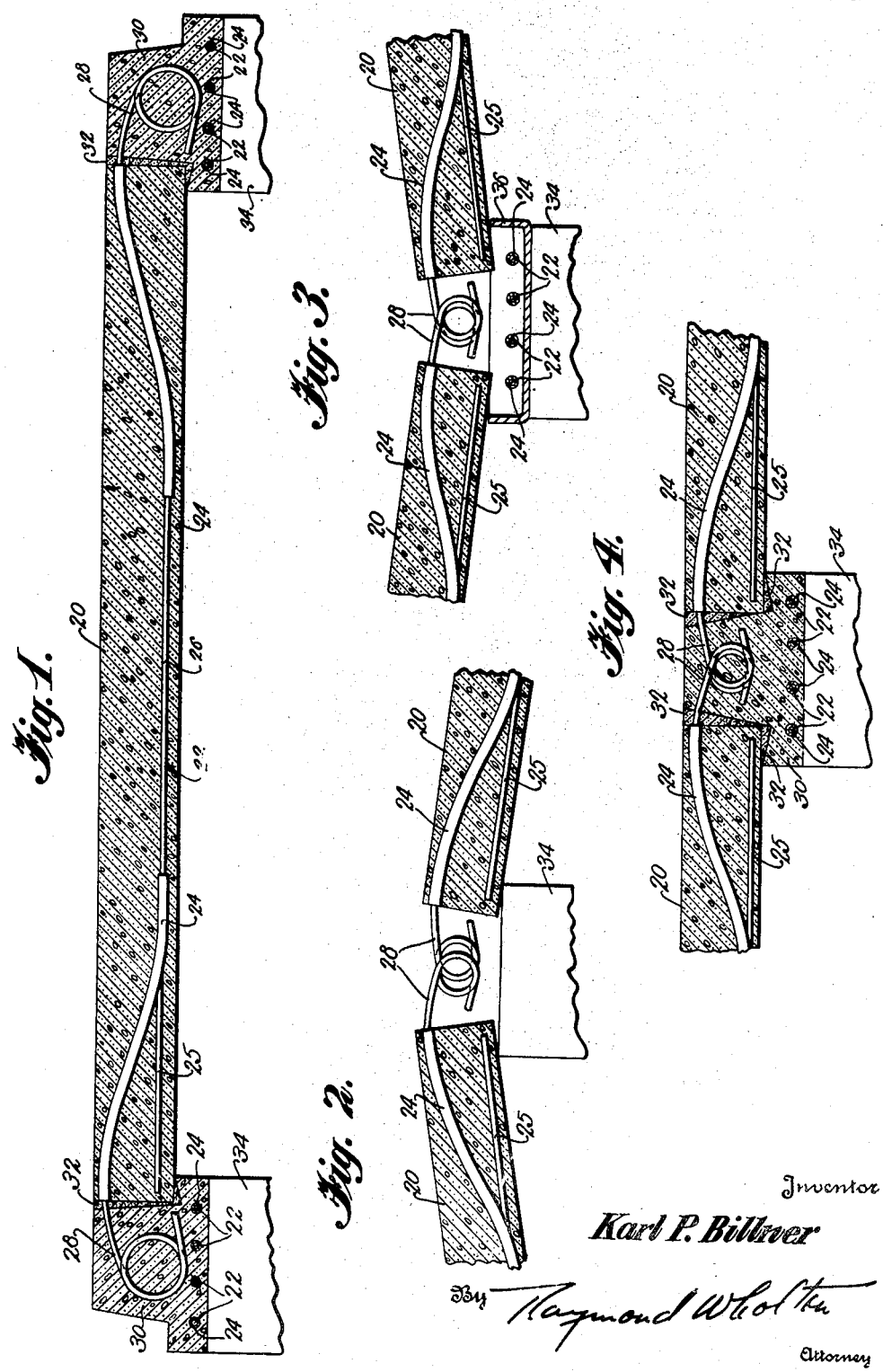
Inventor
Karl P. Billner Sept. 27, 1949.　　　　　　　K. P. BILLNER　　　　　　　2,483,175
METHOD OF MOLDING PRESTRESSED STRUCTURES
Filed Oct. 10, 1947　　　　　　　　　　　　　　　　　4 Sheets-Sheet 2

Inventor
Karl P. Billner
By Raymond W. Colton

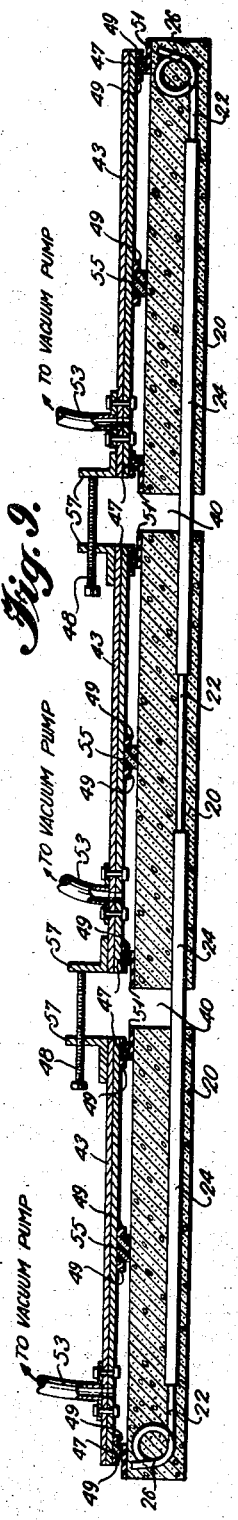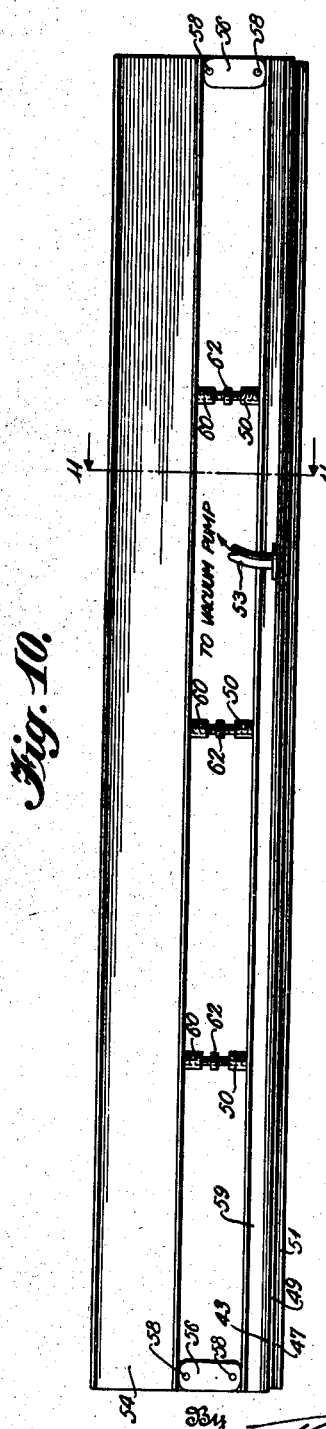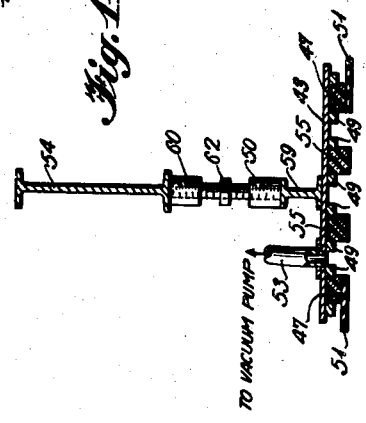

Sept. 27, 1949. K. P. BILLNER 2,483,175
METHOD OF MOLDING PRESTRESSED STRUCTURES
Filed Oct. 10, 1947 4 Sheets-Sheet 4

Inventor
Karl P. Billner
By Raymond Wholton

Patented Sept. 27, 1949

2,483,175

UNITED STATES PATENT OFFICE 2,483,175

METHOD OF MOLDING PRESTRESSED STRUCTURES

Karl P. Billner, Philadelphia, Pa., assignor to Vacuum Concrete, Inc., a corporation of Pennsylvania Application October 10, 1947, Serial No. 779,079

15 Claims. (Cl. 25—154)

The many advantages of prestressed structures are well known in the plastic arts, particularly as applied to reinforced concrete. Through the use of prestressing, cracking is reduced, resistance to shear is increased, a greater proportion of the potential strength of the reinforcing elements can be utilized, and in general, greater strength is realized for a given size and weight of structure, or stated differently, appreciable savings in size and weight can be achieved without sacrificing strength.

Methods and structures involving prestressing have been proposed from time to time over the past half century, as discussed in a summary of the developments in this field appearing in the "Journal of the American Concrete Institute," volume 16, Number 3, January 1945, in an article entitled "Fully and partly prestressed reinforced concrete," by Paul William Abeles.

Among the more serious practical problems encountered with known prestressing techniques, is that of applying and maintaining the desired stresses. And the magnitude of this problem is increasing daily, due in part to the need for prestressing in connection with the current developments in precasting and prefabrication of reinforced concrete bodies.

With a view towards obviating many of the disadvantages of prior art methods and structures, and at the same time enjoying the benefits attending the use of prestressing, this invention contemplates a method of producing a reinforced plastic structure comprising peripherally covering a portion of a reinforcing element to prevent bonding, forming plastic bodies in bonded relationship with portions of the element at opposite sides of its covered portion, relatively shifting the bodies to place the element in tension, and maintaining the element in tension. Plastic bodies composed of concrete are of particular importance according to this invention, but in any case, such bodies are preferably formed in spaced relationship, following which they are separated to place the reinforcing element in tension, and maintained in spaced relationship. The spaced relationship of the bodies will be maintained by the interposition of spacing means between them, which spacing means may assume the form of plastic material; as by depositing a hardening cementitious composition such as grout, between the spaced concrete bodies. The relative shifting or separating effect upon the bodies to place the reinforcing element or elements under tension, may be achieved by relatively rocking or deflecting the bodies, interposing spacing means between them, reversely rocking the bodies and maintaining the components in substantially their resulting positions.

The reinforcing element or elements, having portions of their lengths covered or protected against bonding with concrete or other plastic material, may have a plurality of plastic bodies formed about covered and uncovered portions thereof, so that each plastic body will become bonded with an exposed portion of each element, while permitting relative elongation of the covered portions, whereupon the bodies may be shifted or separated to place the element or elements in tension and the bodies secured in spaced relationship to maintain the elements in tension.

The method also contemplates producing a reinforced plastic structure comprising partially covering a reinforcing element to prevent its bonding with plastic material, forming spaced plastic bodies about covered portions of the element and bonded with uncovered portions of the element, relatively shifting the bodies to place the element in tension and forming plastic material about the element intermediate the bodies. Upon hardening of the plastic material intermediate the bodies, the shifting or separating force will be removed.

Prestressed structures produced in accordance with this invention comprise adjacent plastic bodies, a common pretensioned reinforcing element having spaced portions bonded to the bodies, and an unbonded intermediate portion penetrating at least one of the bodies. A spacer interposed between the bodies may assume the form of a hardened plastic material, cement grout being suitable where the bodies themselves are composed of concrete. In addition to the unbonded portion of the reinforcing element penetrating one or both of the plastic bodies, it will also penetrate the spacer.

Prestressed concrete structural members having such a common pretensioned reinforcing element anchored within them in accordance with the present invention, have performed so outstandingly under load as to promise the beginning of a new era in the field of prestressing.

A more complete understanding of the invention will be afforded by a detailed description based upon the accompanying drawings wherein:

Fig. 1 is a fragmentary sectional elevation showing the application of the invention to a slab supported on a pair of beams;

Fig. 2 is a somewhat diagrammatic sectional elevation depicting one of the steps in forming a pair of slabs of the type depicted in Fig. 1;

Fig. 3 is a sectional elevation, also somewhat diagrammatic, depicting a further step in the production of a pair of slabs of the type depicted in Fig. 1;

Fig. 4 is a fragmentary sectional elevation of a completed structure produced in accordance with the steps of Figs. 2 and 3;

Fig. 9 is a sectional elevation showing an application of the invention to more than two plastic bodies;

Fig. 10 is an elevation of a vacuum beam adapted for use in practicing the invention;

Fig. 11 is a section along line 11—11 of Fig. 10;

Figure 5:
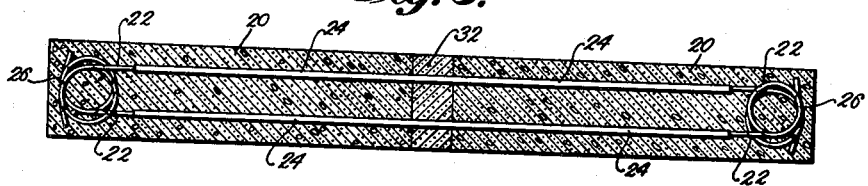
Fig. 5 is a sectional elevation of a structural member such as a power pole or railroad tie produced in accordance with the present invention.

With particular reference to Figs. 1 to 4 inclusive, one or more concrete slabs 20 will be precast about one or more reinforcing elements 22, a portion of whose length is provided with a coating or covering 24 such as grease, an asphaltic composition, tubing, or other material which will prevent a bond between such portion or portions and the concrete. Various other reinforcing elements 25 of customary types may also be used as required by the particular structure involved. As depicted in Fig. 1, uncovered or exposed end portions 28 of the reinforcing element are bent through suitable arcs, shown as approximating 540°, to form loops or helices which project beyond the slab 20 to enter into bonded relationship with adjacent bodies of concrete 30, shown in the form of beams. An intermediate portion 26 of each such reinforcing element 22 is also exposed so as to become bonded with a portion of the concrete constituting the slab 20 itself. Similar reinforcing elements 22 having portions of their lengths provided with coverings or coatings 24 are also depicted as embedded in the beams 30, wherein uncovered intermediate and terminal portions will be bonded in a manner similar to that described in connection with the slab 20.

Gaps defined between each end of the slab and its respective beam are shown in Fig. 1 as filled with a cement grout 32 for maintaining a predetermined substantially constant spaced relationship and accordingly, a predetermined degree of tension will be maintained in the reinforcing element or elements 22.

An appropriate method in accordance with the present invention, for producing structures of this type has been illustrated in part by Figs. 2 to 4 inclusive, wherein a pair of slabs 20 have their opposite ends (only one of which is shown for each slab) seated at the edges of previously erected columns or column forms 34. As shown on a somewhat exaggerated scale in Fig. 2, deflection of the slabs due to their own weight or otherwise will cause their proximate ends to diverge upwardly at acute angles with respect to the vertical. The slabs are then elevated to positions shown on an exaggerated scale in Fig. 3, where their proximate ends define downwardly divergent or reversely directed acute angles with respect to the vertical. The slabs may be shifted to assume such positions with handling apparatus of known types, but it will be particularly advantageous for this purpose to utilize so-called "vacuum beams" of the type illustrated in Figs. 7, 9, 10 and 11 and in another application of the present inventor, Serial No. 733,639, filed March 10, 1947, now Patent No. 2,455,660.

With the slabs in positions such as shown in Fig. 3, a form 36 will be suitably supported below them and a beam 30 then poured between them. The slabs will then be lowered to their horizontal or other ultimate positions and the resulting gaps formed between them and the beam 30 will be filled with cement grout 32 to maintain the desired spaced relationship, and consequently the predetermined tension on the reinforcing elements 22 as produced by shifting the slabs to their ultimate positions will be maintained.

Inasmuch as the uncovered portions 26 and 28 of the reinforcing elements are bonded to the respective bodies of concrete in which they are embedded, it will be clear that when the slabs are relatively separated, shifted, or deflected from the positions assumed in Fig. 3 to positions such as those depicted in Fig. 4, the protected portions of the elements will become elongated under the forces exerted in imparting the ultimate positions to the slabs, thereby producing tensile stresses in the protected portions of the reinforcing elements, with corresponding compressive stresses imposed upon the concrete bodies themselves.

After the operations have been completed in the manner described and the grout hardened, the vacuum beams will be removed. Then where desired, each beam 30 may be similarly prestressed by imparting to it an upward deflection by the use of one or more vacuum beams of the type shown in Fig. 10 for example, and embedding unprotected sections of the projecting ends of its reinforcing elements 22 in bonded relationship with a concrete body such as that constituting a portion of the column adjacent thereto. Then the beam will be shifted to its ultimate position, grout interposed to fill the gap or gaps produced, and after the grout has hardened, the vacuum beam or other handling apparatus will be removed.

Prefabricated members, either solid or hollow, such as power poles, beams, walls, pipes, piles, railway ties, and many others may be produced in accordance with the present invention.

Figure 6:
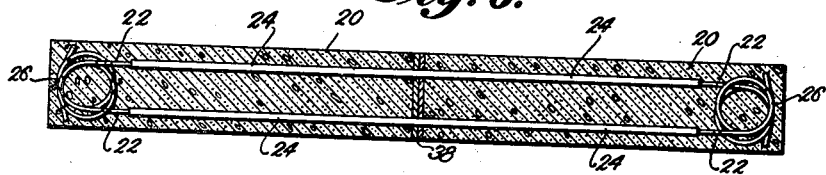
Fig. 6 is a sectional elevation of a partially completed member of the type depicted in Fig. 5.
Figure 7:
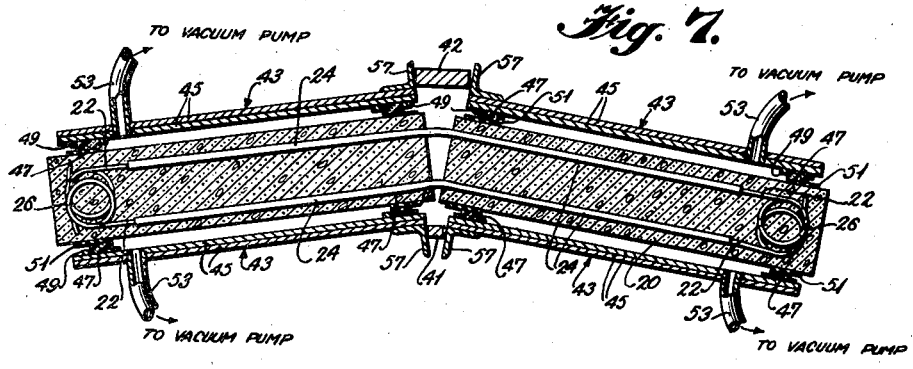
Fig. 7 is a sectional elevation depicting an intermediate step in the production of the member of Fig. 5.

As illustrated by Figs. 5 to 7 inclusive, the reinforcing elements 22, having unprotected terminal portions 26 in the form of loops and a partial covering or sheathing 24 to prevent a bond with concrete, are laid in a suitable form which also contains one or more intermediate separators 38, such as cardboard or wood, whereupon concrete is poured to form the adjacent bodies 20 separated by the spacer 38 and embedding their common reinforcing element or elements 22.

After the concrete constituting the bodies 20 has hardened sufficiently, the bodies are relatively shifted or separated as by a rocking action, suitably produced with existing apparatus, or preferably with vacuum beam or mat apparatus of the type shown in Fig. 7 and further described in the pending application above referred to, to positions such as those depicted in Fig. 7 wherein a convergent gap 40 will be defined between the proximate ends of the bodies. A spacer 41, such as a steel plug will be interposed between the proximate ends of the vacuum mats or beams 43, to prevent damage to the bodies, whereupon the initial rocking movement will be effected about the plug 41 as a fulcrum. When their displacement has assumed a predetermined value, a larger spacer 42, in the form of a steel plug or the like will be introduced between the opposed flanges of the upper vacuum mats, following which the bodies will be reversely rocked by shifting the mats about the spacer 42 as a fulcrum until the desired degree of alignment of their surfaces has been achieved. By this time, the spacer 41 will have been removed and a spacer similar to the upper one will be substituted so as to maintain the bodies in their desired spaced relationship and the reinforcement under the predetermined tension required for the particular structure. The separator 38 can then be removed and cement grout 32 deposited between the ends of the bodies. Upon hardening of the cement grout, the vacuum mats will be removed, since the predetermined tension in the reinforcing elements will then be maintained by the hardened grout under compression between the bodies.

The vacuum beams or mats 43 depicted in Fig. 7 as applied to the opposed surfaces of the bodies, may be constructed of a suitable number of layers of sheet material such as plywood 45, to one surface of which flexible and resilient peripheral sealing elements 47 of sponge rubber or the like are secured and located between beads or strips 49 to define an open box for application to the concrete bodies. To the surfaces of the sealing elements which are applied adjacent the concrete bodies, thin flexible sealing flaps 51, such as yellow balloon rubber or thin rubberized fabric, are attached so that when the space defined between each mat and the concrete body to which it is applied is evacuated through a conduit 53 leading to a vacuum pump, a preliminary seal will be established by the flaps 51, whereupon the sealing elements 47 will yield until the mat assumes its ultimate position in which it becomes substantially unitary with the concrete body. Where the span of such a mat or beam requires it, one or more supporting elements of a material similar to that constituting the sealing elements, may be applied to intermediate portions of its under surface between suitable beads or strips, in a manner similar to that described with reference to Fig. 9. The vacuum mats may be suitably adapted for cooperation with handling apparatus for transmitting the desired movements through the mats to shift the slabs or other concrete bodies involved. At the proximate edges of the mats shown in Fig. 7, suitable angles or other structural sections 57 are secured, between which the steel plugs 41 and 42 or other spacers serving as fulcrums are interposed. Accordingly, from the positions depicted in Fig. 7, remote portions of the bodies 20 will be elevated through the mats by means of suitable handling equipment until the proximate ends of beams assume a parallel or other ultimate relationship, at which time the lower plug 41 will be replaced by a larger one similar to the upper plug 42, the separator or separators 38 will be removed, and the grout 32 introduced and permitted to harden. The vacuum beams or mats can then be removed from the thus completed prestressed bodies by reducing or breaking the vacuum.

Figure 8:
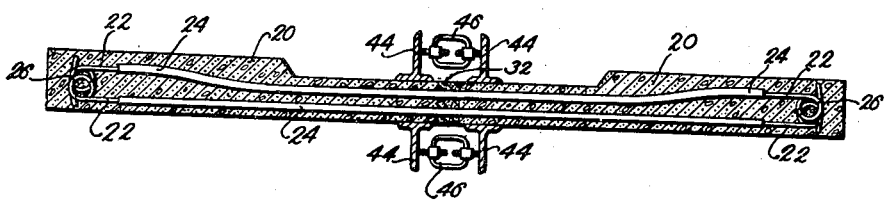
Fig. 8 is a sectional elevation depicting another mode of application of prestressing force in carrying out the invention.

In lieu of the rocking motion already described for separating the structural bodies to subject their reinforcing elements to tension, axial separation may be effected through the use of suitable clamps 44, as shown in Fig. 8, applied by means of bolts or the like, not shown, near the proximate ends of the members 20, which are then urged apart by any one of a variety of means such as jacks or turnbuckles 46 to permit the deposition of the cementitious grout 32 between the members while the reinforcing elements 22 are maintained in tension. After hardening of the grout, the stressing force of the turnbuckles or other means may be removed and the clamps dismantled from the completed structural member, exemplified by the railroad tie represented in Fig. 8.

Whereas the looped ends of the reinforcing elements have been shown in the various examples as being of the type described with reference to Fig. 1, it should be understood that the ends may assume other forms so long as sufficient bonding area is established to safely sustain the loads applied in prestressing and subsequent use.

As already described in conjunction with Fig. 1, the anchorages may be produced in some instances by merely omitting the sheath or covering material at those sections where bonding is desired. In this way, a composite structure involving more than two concrete bodies may be produced, by applying separating forces at each joint, followed by the insertion of spacing means to maintain tension in the reinforcing elements. An example of this type appears in Fig. 9 wherein three concrete bodies 20 are cast in spaced relationship to embed one or more reinforcing elements 22 having spaced protected portions 24 alternating with unprotected portions. Whereas the unprotected ends 26 of the reinforcing element are looped as in the preceding figures, the intermediate unprotected portion which becomes bonded with the central concrete body need not be deformed so long as a sufficient length for adequate anchorage is exposed for bonding with the concrete. The mats 43 in this figure are constructed somewhat similarly to those described with respect to Fig. 7, but in this case intermediate supports 55 of sponge rubber or the like are located between beads or strips 49 and one of the angles 57 of each cooperating pair is threaded to receive one or more adjusting screws 48 for bearing relationship upon the other angle of the pair. Accordingly, when the concrete bodies 20 have become hardened sufficiently to perfect their bonds with the respective exposed portions of the reinforcing element or elements, the mats 43 will be applied, a subatmospheric pressure imposed between them and their respective bodies, and the screws 48 adjusted until the bodies have been separated to an extent sufficient to produce the desired tension in the reinforcement. With the various parts in this condition as illustrated in Fig. 9, the gaps 40 defined between the adjacent bodies will be filled with cement grout, upon hardening of which, the subatmospheric pressures and the mats themselves will be removed from the prestressed structure thus produced.

A vacuum beam or mat of a type suitable for use in connection with many applications of the invention, such as that depicted in Figs. 1 to 4 inclusive for example, has been shown in Figs. 10 and 11. The sealing elements 47, flaps 51 and intermediate supports 55 secured to the under surface of the mat 43 are similar to those described with reference to Figs. 7 and 9. The upper surface of the mat has a relatively light I-beam 59 welded or otherwise suitably secured thereto, and to whose upper flange, a plurality of suitably spaced threaded sockets 50 are secured, as by welding. The ends of the I-beam 59 are articulated by means of pins 58 and links 56 to the ends of a heavier I-beam 54 thus permitting relative movement between the two I-beams, the heavier of which is adapted to be engaged by a suitable hoist for imparting to the plastic bodies and their reinforcement the various movements and forces required. Threaded sockets 60 welded or otherwise secured to the lower flange of the I-beam 54 are spaced to cooperate with the similar sockets 50 to receive the oppositely threaded ends of adjusting screws 62. From this construction it will follow that by suitably adjusting the screws 62, the relatively light I-beam 59 and the somewhat flexible mat secured thereto can be deformed to an extent necessary to deflect the concrete slab, beam, or other member, upwardly or downwardly to achieve the type and degree of shifting necessary to stress the reinforcing material as required in practicing the present invention.

The discussion thus far has dealt primarily with prestressing of a type which may be characterized as substantially linear ar longitudinal. While the longitudinal prestressing of tubular bodies such as concrete piles and pipes is definitely contemplated by the foregoing, this invention is likewise applicable to circumferential prestressing of such bodies, which can be accomplished in a manner such as that illustrated in Figs. 12, 13, 14 and 15, by way of example.

Figure 13:
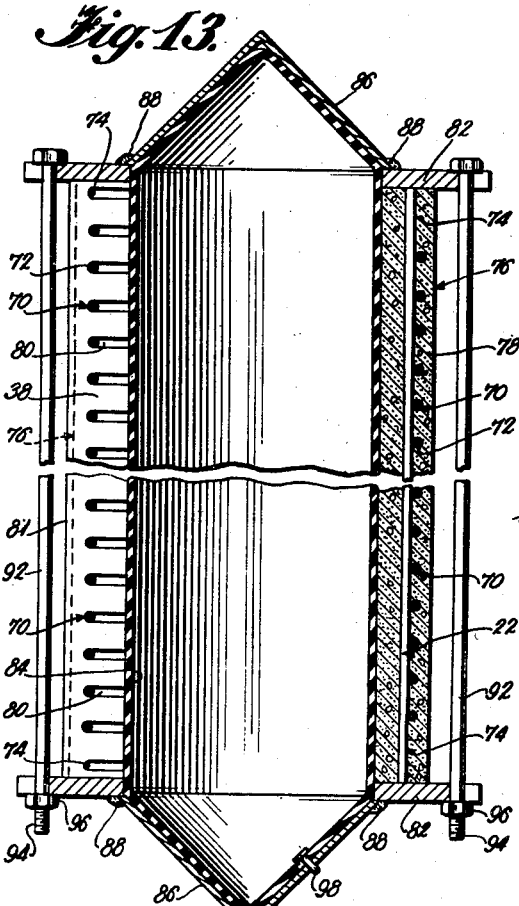
Fig. 13 is a section along line 13—13 of Fig. 12.

The composite body depicted in these figures utilizes a helical reinforcing element 70, provided with an intermediate coating or covering 72 of soft asphalt or other materials similar to those previously described which prevents bonding with concrete. The terminal portions 74 of the helix are left bare through a predetermined arc, which may be a fraction of a convolution, to establish a bond with concrete sufficient to sustain the load to be imposed in effecting and maintaining the predetermined stress in its covered portions. This helix, together with suitable longitudinal reinforcing elements 22, which may be of the coated type described herein, or otherwise, will be supported in a suitable form, not shown, with a suitable number of radial separators 38, of paper, wood, suitably formed sheet metal, or other material which will be separable from hardened concrete, supported at desired arcuate intervals with respect to the helix. As shown in Fig. 13, the separators have a length equal to that of the tubular body 76, a width in excess of its wall thickness to facilitate clamping in an outer mold, and a thickness designed to separate the adjacent segments 78 constituting the concrete body by a desired dimension. The separators, of which three have been shown in this example, are provided with notches 80 which open inwardly to receive the convolutions of the helix 70 in properly spaced relationship, from which the separators may be withdrawn outwardly after the body has been expanded.

With the parts thus assembled in a mold, the outer edges 81 of the separators being clamped between adjacent sections of the mold, the concrete will be poured and hardened, by the use of applicant's vacuum process if desired, whereupon separation of the composite body from the mold will be effected. The resulting body will then be introduced between annular retaining flanges 82 applied to its ends after having first received an inflatable form 84 of rubber or the like, having a generally cylindrical shape, confined at its ends by closures 86 which may be flat, rounded, or conical as shown, secured to the respective annuli by welding 88 or the like. The annular flanges are provided with peripheral notches 90 for the reception of bolts 92, threaded at their ends 94 to receive nuts 96 which are advanced only sufficiently to prevent undesired axial expansion of the inflatable form 84 upon the introduction of fluid under pressure through its inlet 98, which inlet may be valved if desired.

Figure 12:
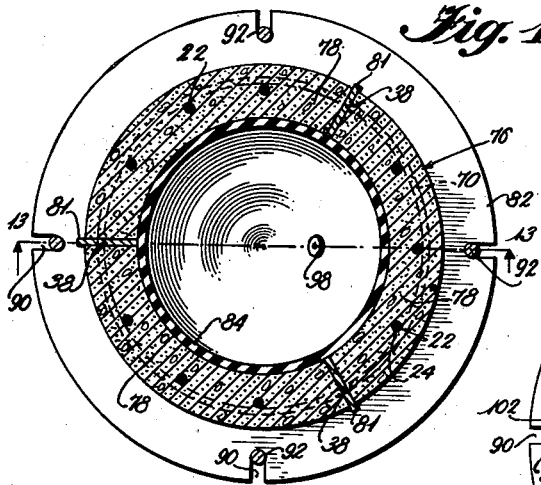
Fig. 12 is a transverse sectional elevation illustrating the invention in its application to circumferential prestressing of tubular bodies such as piles or pipes.
Figure 14:
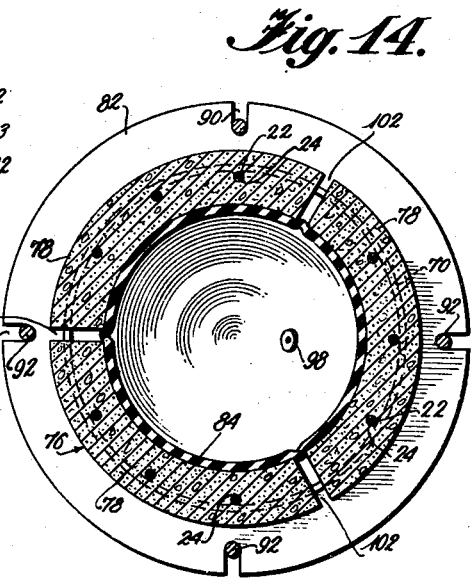
Fig. 14 is a transverse sectional elevation similar to Fig. 12 showing a subsequent step of the method.
Figure 15:
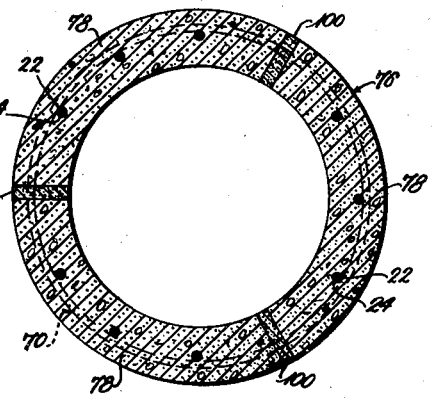
Fig. 15 is a transverse sectional elevation of a completed circumferentially prestressed body.

Upon the introduction of fluid at a predetermined pressure into the inflatable form 84, the segments 78 will be shifted radially from positions such as those depicted in Fig. 12 to their displaced positions shown in Fig. 14. The attending movement serves to stress the coated or covered portions of the reinforcing element 70 to the extent required for the desired degree of prestress, whereupon, the separators 38 will be removed and cement grout 100 introduced under pressure into the gaps 102 defined between the segments and the inflatable form. Upon hardening of the grout, the inflatable form will be deflated and removed along with its retaining members. The resulting circumferentially prestressed body is illustrated in Fig. 15, wherein the helical reinforcement has its coated or covered portion under tension, with the hardened grout 100 under compression. Deflation of the form 84 will in some instances be accomplished in a plurality of steps: after inflating the form to shift the segments to an extent exceeding their ultimate positions, and thereby stressing the reinforcement beyond the stress to be maintained in the completed product, the separators 38 are removed and the grout 100 introduced into the gaps between the segments; then while the grout is still plastic, the form 84 is partially deflated to compact the grout under the contracting effect of the reinforcement, resulting in the expression of a portion of the excess vehicle in the grout which may be removed through a perforate outer form, not shown, which will retain the solid portions in the gap while permitting the liquid to escape; the partially deflated form will maintain the segments in substantially their ultimate positions and the reinforcement under substantially the predetermined tension for the finished product while the grout is hardening; after the grout has hardened sufficiently to maintain these conditions, the form will be further deflated and removed, along with its retaining members.

Longitudinal prestressing of the annular or tubular composite body may be effected with respect to the reinforcing elements 22 in accordance with the procedures previously described, either before or after the circumferential prestressing has been accomplished.

The terms "prestress," "pretension" and their variations have been used in a sense to denote the application of forces prior to those encountered when the bodies are subjected to the loads which they were designed to support. According to the terminology employed by Abeles in the article cited herein, the type of prestressing characterizing the present invention would be referred to as "post-stretching," since the tension is effected after hardening of the concrete or other plastic material.

The present invention is applicable in a large variety of ways to many types of structures, as will occur to those skilled in the art like they have been recognized already by the present inventor. Accordingly, the few examples shown in the drawings and described herein should not be construed as restricting the invention beyond the scope of the appended claims.

I claim:

1. A method of producing a reinforced structure comprising peripherally covering a portion of a reinforcing element to prevent bonding, forming plastic bodies in bonded relationship with portions of said element at opposite sides of its covered portion, applying a force intermediate the ends of at least one of said bodies and thereby relatively shifting said bodies to place said element in tension, interposing spacing means between substantially the entire opposed areas of said bodies to maintain said element in tension, and removing said force to place said bodies and spacing means in compression.

2. A method of producing a reinforced structure comprising peripherally covering a portion of a reinforcing element to prevent bonding, forming plastic bodies in bonded relationship with portions of said element at opposite sides of its covered portion, applying a force intermediate the ends of at least one of said bodies and thereby relatively shifting said bodies to place said element in tension, interposing plastic material between substantially the entire opposed areas of said bodies to maintain said element in tension, and removing said force after hardening of said plastic material to place said bodies in compression.

3. A method of producing a reinforced structure comprising peripherally covering a portion of a reinforcing element to prevent bonding, forming plastic bodies in bonded relationship with portions of said element at opposite sides of its covered portion, relatively rocking said bodies to place said element in tension, interposing spacing means between said bodies, and relatively reversely rocking said bodies about said spacing means to maintain said element in tension.

4. A method of producing a reinforced concrete structure comprising peripherally covering a portion of a reinforcing element to prevent bonding with concrete, forming segmental concrete bodies in spaced relationship to embed a covered portion of said element and effect a bond with an uncovered portion of said element, applying a force intermediate the ends of at least one of said bodies and thereby relatively shifting said segments radially to place said element in tension, introducing grout between said segments to maintain said element in tension, and removing said force after hardening of said grout to place said bodies in compression.

5. A method of producing a reinforced concrete structure comprising peripherally covering a portion of a reinforcing element to prevent bonding with concrete, molding spaced concrete segments to define an annular body embedding a covered portion of said element and bonding with an uncovered portion thereof, exerting a force to shift said segments radially and place said element in tension, introducing grout between said segments and reducing said force in stages to place said segments in compression.

6. A method of producing a reinforced structure comprising partially covering a reinforcing element to prevent bonding, forming plastic bodies with adjacent opposed surfaces about spaced covered portions of said element with uncovered portions of said element bonded thereto, applying a relative separating force to said bodies to place said element in tension, forming plastic material about said element intermediate substantially the entire opposed surfaces of said bodies, and reducing said force after hardening of said plastic material to place said bodies in compression.

7. A method of producing a reinforced structure comprising partially covering a reinforcing element to prevent bonding, forming plastic bodies with adjacent opposed surfaces about spaced covered portions of said element with uncovered portions of said element bonded thereto, applying a relative separating force to said bodies beyond their opposed surfaces to place said element in tension, forming plastic material about said element intermediate substantially the entire opposed surfaces of said bodies, and removing said force after hardening of said plastic material to place said bodies in compression.

8. A method of producing a reinforced concrete structure comprising partially covering a reinforcing element to prevent bonding with concrete, forming concrete bodies with adjacent opposed surfaces about spaced covered portions of said element with uncovered terminal portions of said element bonded thereto, applying a relative separating force to said bodies to place said covered portions of said element in tension, forming plastic grouting material about said element intermediate substantially the entire opposed surfaces of said bodies, and reducing said force after hardening of said plastic material to place said bodies in compression.

9. A method of producing a reinforced structure comprising partially covering a reinforcing element to prevent bonding, forming plastic bodies with adjacent opposed surfaces about spaced covered portions of said element with uncovered portions of said element bonded thereto, applying a relative separating force to said bodies to define a gap therebetween and simultaneously place said element in tension, introducing plastic material into said gap about said element intermediate substantially the entire opposed surfaces of said bodies, and reducing said force after hardening of said plastic material to place said bodies in compression.

10. A method of producing a reinforced structure comprising partially covering a reinforcing element to prevent bonding, forming plastic bodies with adjacent opposed surfaces about spaced covered portions of said element with uncovered portions of said element bonded thereto, applying a relative separating force to said bodies to place said element in tension, introducing spacing material intermediate substantially the entire opposed surfaces of said bodies, and reducing said force to place said bodies and spacing material in compression.

11. A method of producing a reinforced concrete structure comprising partially covering a reinforcing element to prevent bonding with concrete, forming concrete bodies with adjacent opposed surfaces about spaced covered portions of said element with uncovered portions of said element bonded thereto, applying a relative separating force intermediate the ends of at least one of said bodies to place said element in tension, forming a hardening cementitious material about said element intermediate substantially the entire opposed surfaces of said bodies, and reducing said force after hardening of said cementitious material to place said bodies in compression.

12. A method of producing a reinforced structure comprising partially covering a reinforcing element to prevent bonding, forming a plastic body adjacent to an abutment and about a covered portion of said element with an uncovered portion of said element bonded thereto, applying a force to relatively separate said body and abutment placing said uncovered portion of said element in tension, forming plastic material about said element intermediate said abutment and substantially the entire adjacent surface of said body and reducing said force after hardening of said plastic material to place said body in compression.

13. A method of producing a reinforced concrete structure comprising partially covering a reinforcing element to prevent bonding with concrete, forming concrete bodies with adjacent opposed surfaces about spaced covered portions of said element with uncovered portions of said element bonded thereto, applying a relative separating force to intermediate portions of said bodies to place said element in tension, forming plastic material about said element intermediate substantially the entire opposed surfaces of said bodies, and reducing said force after hardening of said plastic material to place said bodies in compression.

14. A method of producing a reinforced structure comprising partially covering a reinforcing element to prevent bonding, forming plastic bodies about spaced covered portions of said element with uncovered portions of said element bonded thereto, securing a force transmitting member to one of said bodies by applying a subambient pressure between said member and body, applying a relative separating force to said bodies through said member to place said element in tension, forming plastic material about said element intermediate substantially the entire opposed surfaces of said bodies, and reducing said force after hardening of said plastic material to place said bodies in compression.

15. A method of producing a reinforced structure comprising partially covering a reinforcing element to prevent bonding, forming plastic bodies about spaced covered portions of said element with uncovered portions of said element bonded thereto, securing a force transmitting member to each of said bodies respectively by means of subambient pressure, applying a relative separating force to said bodies through said members to place said element in tension, forming plastic material about said element intermediate substantially the entire opposed surfaces of said bodies, and reducing said force after hardening of said plastic material to place said bodies in compression.

KARL P. BILLNER.

REFERENCES CITED

The following references are of record in the file of this patent:

UNITED STATES PATENTS

| Number | Name | Date |
| --- | --- | --- |
| 1,965,748 | Mitchell | July 10, 1934 |
| 2,048,253 | Freyssinet | July 21, 1936 |
| 2,226,201 | Freyssinet | Dec. 24, 1940 |
| 2,319,105 | Billner | May 11, 1943 |
| 2,413,990 | Muntz | Jan. 7, 1947 |
| 2,414,011 | Billner | Jan. 7, 1947 |

FOREIGN PATENTS

| Number | Country | Date |
| --- | --- | --- |
| 338,934 | Great Britain | Nov. 25, 1930 |